United States Patent [19]

Gover et al.

[11] Patent Number: 5,557,548

[45] Date of Patent: Sep. 17, 1996

[54] METHOD AND SYSTEM FOR PERFORMANCE MONITORING WITHIN A DATA PROCESSING SYSTEM

[75] Inventors: Frank C. Gover, Round Rock; Frank E. Levine; Edward H. Welbon, both of Austin, all of Tex.

[73] Assignee: International Business Machines Corporation, Armonk, N.Y.

[21] Appl. No.: 353,006

[22] Filed: Dec. 9, 1994

[51] Int. Cl.⁶ .................................................. G06F 13/00
[52] U.S. Cl. .................... 364/551.01; 364/484; 364/569; 371/61; 395/550
[58] Field of Search ..................................... 395/550, 375; 371/61; 364/484, 569

[56] References Cited

U.S. PATENT DOCUMENTS

| | | | |
|---|---|---|---|
| 3,760,372 | 9/1973 | Bitran | 340/172.5 |
| 4,519,091 | 5/1985 | Chu et al. | 377/44 |
| 4,815,113 | 3/1989 | Ludwig et al. | 377/39 |
| 5,053,983 | 10/1991 | Hyatt | 364/724.03 |
| 5,090,034 | 2/1992 | Ganza | 377/55 |
| 5,107,439 | 4/1992 | Clark | 364/484 |
| 5,198,750 | 3/1993 | Prokin | 324/76047 |
| 5,446,876 | 8/1995 | Levine et al. | 395/184.01 |

*Primary Examiner*—James P. Trammell
*Assistant Examiner*—Kamini S. Shah
*Attorney, Agent, or Firm*—Mark E. McBurney; Andrew J. Dillon

[57] ABSTRACT

A method and system are disclosed which monitor specified events among the number of events within a data processing system. The system of the present invention includes a software writable control register which specifies the events within the data processing system which are to be monitored, hardware for monitoring the specified events, and logic for detecting each occurrence of a specified event. In addition, the system of the present invention includes a number of counters which incrementally advance in response to an occurrence of a specified event, wherein, in response to a setting of the control register, at least one of the counters is programmed to incrementally advance in response to an overflow from a second counter. By selectively linking the counters in this manner, the maximum number of occurrences which may be counted by the counters may be dynamically altered.

8 Claims, 4 Drawing Sheets

Monitor Mode Control Register 0 (MMCR0)

METHOD AND SYSTEM FOR PERFORMANCE MONITORING WITHIN A DATA PROCESSING SYSTEM

BACKGROUND OF THE INVENTION

1. Technical Field

The present invention relates in general to a data processing system, and in particular to a method and system for performance monitoring within a data processing system. Still more particularly, the present invention relates to a method and system for counting events within a data processing system in which a plurality of counters may be selectively linked.

2. Description of the Related Art

Within state-of-the-art processors, facilities are often provided which enable the processor to count occurrences of software-selectable events and to time the execution of processes within an associated data processing system. These facilities are known as the performance monitor of the processor.

Events within the data processing system are counted by one or more counters within the performance monitor. The operation of such counters is managed by a control register, which is comprised of a plurality of bit fields. In general, both the control register and the counters are readable and writable by software. Thus, by writing values to the control register, a user may select the events within the data processing system to be monitored and specify the conditions under which the counters are enabled.

The performance monitor has many applications which enable a user to optimize the performance of a data processing system. For example, software engineers may utilize timing data from the performance monitor to optimize programs by relocating branch instructions and memory accesses. In addition, the performance monitor may be utilized to gather data about the access times to the data processing system's L1 cache, L2 cache, and main memory. Utilizing this data, system designers may identify performance bottlenecks specific to particular software or hardware environments.

Because the number of occurrences of an event, such as a memory access, may be large, state-of-the-art performance monitors typically utilize large counters (e.g., 32-bit counters). In addition, because each counter counts occurrences of only a single event, state-of-the art performance monitors utilize a number of counters to provide a broad description of system performance. Consequently, to provide the functionality of multiple large counters, the processor chip area allocated to the performance monitor becomes large as the size and number of counters increases. Because the cost of processor fabrication rises concomitantly with a processor's die size, the additional functionality provided by additional counters and increased counter size is often sacrificed due to economic considerations.

Consequently, it would be desirable to provide a method and system for counting events within a data processing system which reduce the size of a plurality of counters within a performance monitor without reducing the maximum number of event occurrences which may be counted without overflow.

SUMMARY OF THE INVENTION

It is therefore one object of the present invention to provide an improved data processing system.

It is another object of the present invention to provide an improved method and system for performance monitoring within a data processing system.

It is yet another object of the present invention to provide an improved method and system for counting events within a data processing system in which a plurality of counters may be selectively linked.

The foregoing objects are achieved as is now described. A method and system are disclosed which monitor specified events among the number of events within a data processing system. The system of the present invention includes a software writable control register which specifies the events within the data processing system which are to be monitored, hardware for monitoring the specified events, and logic for detecting each occurrence of a specified event. In addition, the system of the present invention includes a number of counters which incrementally advance in response to an occurrence of a specified event, wherein, in response to a setting of the control register, at least one of the counters is programmed to incrementally advance in response to an overflow from a second counter. By selectively linking the counters in this manner, the maximum number of occurrences which may be counted by the counters may be dynamically altered.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
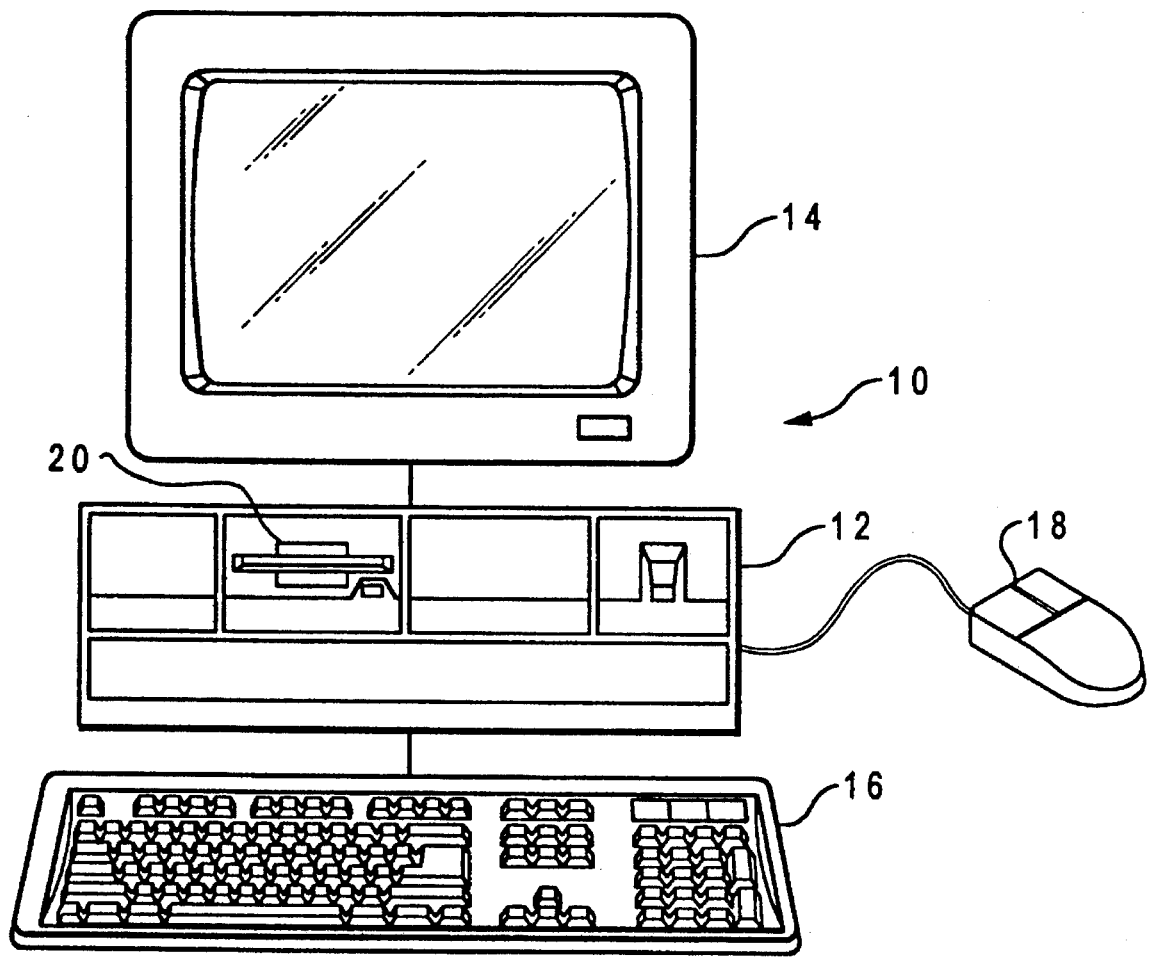
FIG. 1 illustrates a data processing system utilizing the method and system of the present invention.

With reference now to the figures and in particular with reference to FIG. 1, there is illustrated a data processing system employing the method and system of the present invention. As depicted, data processing system 10 includes processing unit 12, display device 14, keyboard 16, and mouse 18. As is well-known in the art, a user may input data to data processing system 10 utilizing keyboard 16 or mouse 18. Data processing system 10 outputs data to a user via display device 14. Processing unit 12 includes means for interfacing display device 14, keyboard 16, and mouse 18 to processor 30, which is illustrated in FIG. 2.

Figure 2:
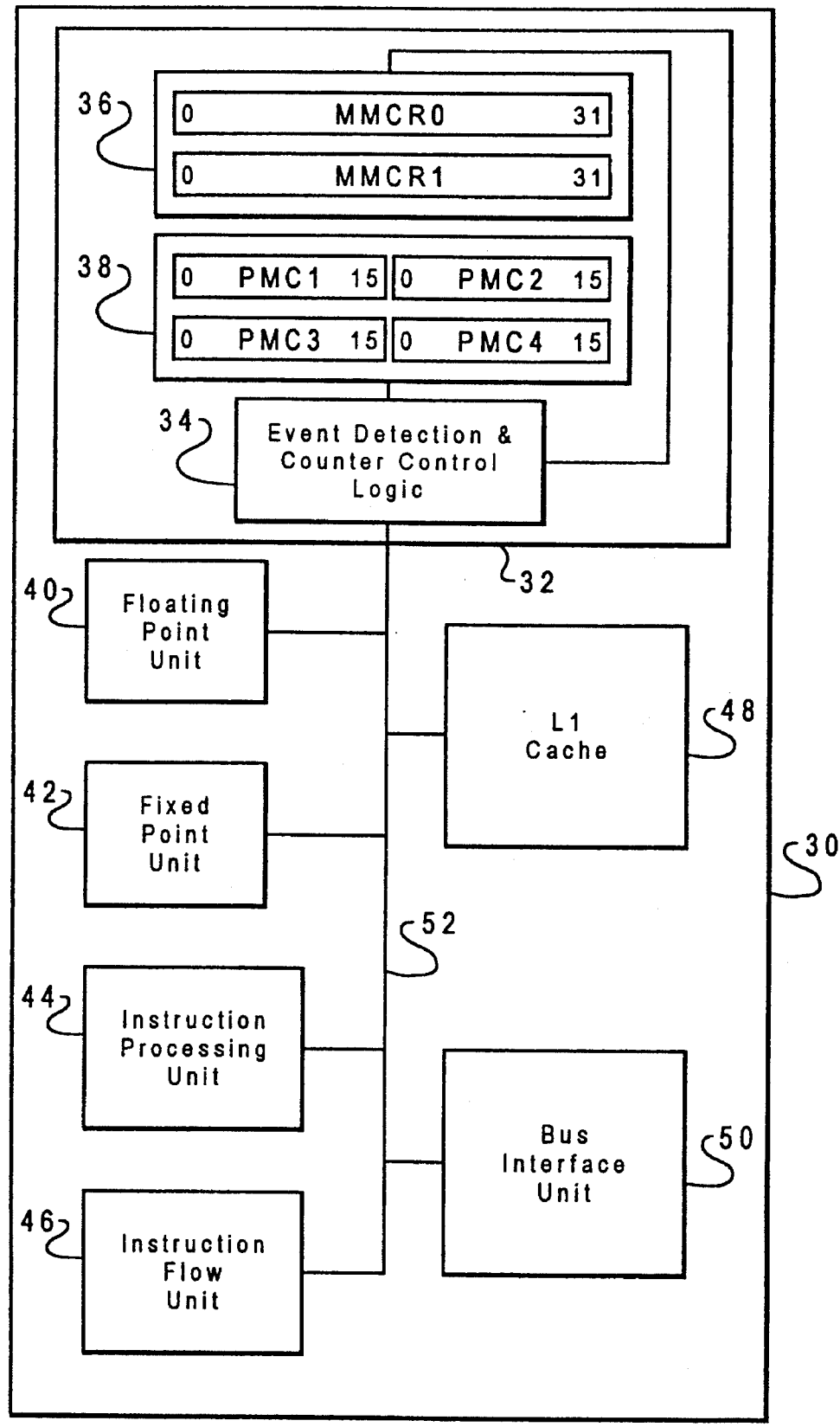
FIG. 2 depicts a block diagram of the processor utilized by the data processing system illustrated in FIG. 1.

Referring to FIG. 2, there is depicted a block diagram of a processor employing the method and system of the present invention. As illustrated, processor 30 includes performance monitor 32, floating point unit 40, fixed point unit 42, instruction processing unit 44, instruction flow unit 46, L1 cache 48, bus interface unit 50, and internal bus 52. In a preferred embodiment of the present invention, processor 30 includes a pipelined processor capable of executing multiple instructions in a single cycle, such as the PowerPC 620 RISC processor.

As depicted, performance monitor 32 includes event detection and counter control logic 34, control registers 36, and counters 38. In the preferred embodiment illustrated in FIG. 2, counters 38, designated PMC1–PMC4 (performance monitor counters 1–4), are 16-bit counters and control registers 36, designated MMCR0 and MMCR1 (monitor mode control registers 0 and 1), are 32-bit registers. One skilled in the art will appreciate that the size of counters 38 and control registers 36 is dependant upon design considerations of processor 30, including the desired functionality of performance monitor 32 and the chip area available within processor 30.

Figure 3:
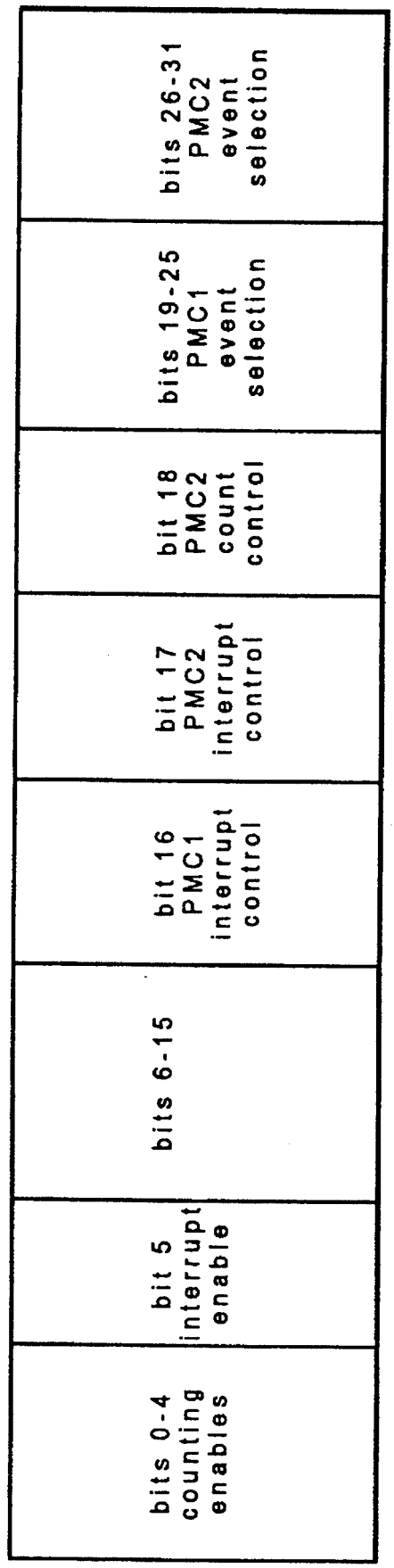
FIG. 3 illustrates a monitor mode control register (MMCR) utilized to manage the plurality of counters depicted in FIG. 2.

With reference now to FIG. 3, there is illustrated a representation of MMCR0 which controls the operation of counters PMC1 and PMC2. As illustrated, MMCR0 is partitioned into a number of bit fields whose settings select events to be counted, enable performance monitor interrupts, and specify the conditions under which counting is enabled. MMCR1, which controls the operation of PMC3 and PMC4, is arranged similarly.

As depicted, bits 0–4 and 18 of MMCR0 determine the scenarios under which PMC1 and PMC2 are enabled to count. By setting bits with appropriate software, a user may enable either or both PMC1 and PMC2, or enable PMC1 initially and enable PMC2 only after PMC1 becomes negative. Bits 5, 16, and 17 are utilized to control interrupts triggered by PMC1 and PMC2. If an interrupt for a PMC is enabled, an interrupt is generated when the counter becomes negative (i.e., the most significant bit is a 1). Finally, bits 19–25 and bits 26–31 are utilized to select the events monitored by PMC1 and PMC2, respectively. Although PMC1 can monitor 43 different events, and PMC2 can monitor 32 different events, each counter can monitor only one event at a time. According to the method and system of the present invention, the events monitored by PMC1 and PMC2 include not only events generated by units 40–50 of FIG. 2, but also overflows from other PMCs among counters 38.

Figure 4:
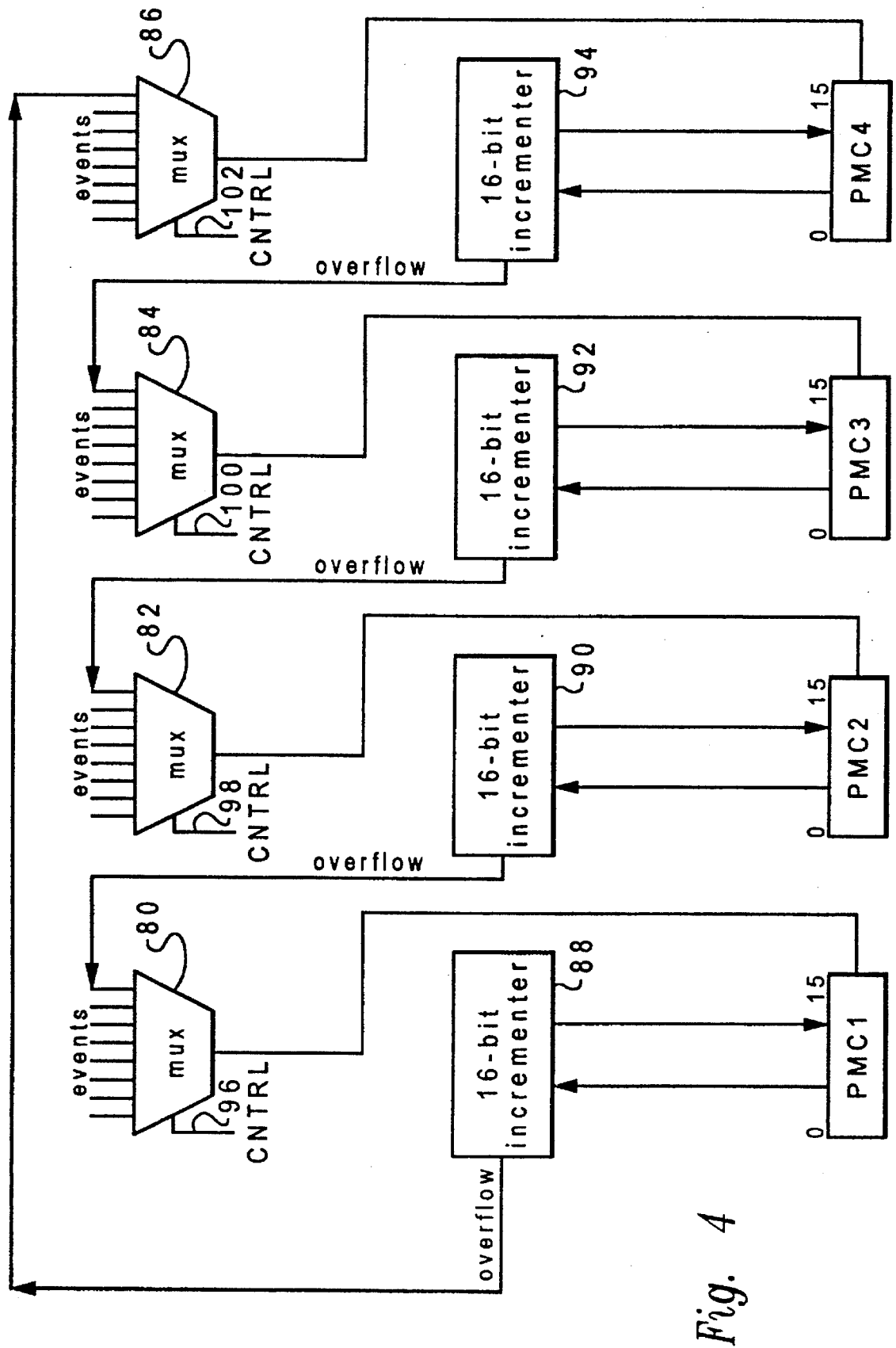
FIG. 4 depicts a detailed block diagram of the plurality of counters utilized by the present invention to count events within the data processing system depicted FIG. 1.

Referring now to FIG. 4, there is depicted a more detailed block diagram of counters 38 of FIG. 2. Each of PMC1–PMC4 has an associated multiplexer 80–86 and a 16-bit incrementer 88–94. In response to control signals 98–102 from event detection and counter control logic 34 of FIG. 2, each of multiplexers 80–86 selects from among the plurality of input events the event specified by the bit field within MMCR0 or MMCR1 which selects events for the multiplexer's associated counter. When a selected event occurs, the counter for which the event is selected is incrementally advanced by its associated 16-bit incrementer. If, for example, the event selected for PMC1 as determined by bits 19–25 of MMCR0 is the overflow from PMC2, PMC1 incrementally advances only when PMC2 overflows. Consequently, when PMC1 and PMC2 are configured in this manner, PMC1 and PMC2 form a 32-bit counter. Thus, by setting bits within MMCR0, a user may selectively determine the maximum number of occurrences counted by PMC1–PMC4 by linking two or more counter together. If a selected event does not occur during a given processor cycle, the counter for which the event is selected remains unchanged for the processor cycle. In the preferred embodiment depicted in FIG. 4, each counter may count overflows only from the preceding counter. As will be understood by one skilled in the art, in another embodiment of the present invention each PMC may count overflows from each of the other counters. For example, PMC1 could count overflows from PMC2, PMC3, or PMC4; PMC2 could count overflows from PMC1, PMC3, or PMC4, etc.

Returning to FIG. 2, performance monitor 32 monitors selected events generated by the activity of units 40–50 or overflows from PMC1–PMC4 and counts the occurrences of the selected events utilizing counters 38. For example, a user may desire to utilize performance monitor 32 to analyze the execution of software in order to design algorithms and task schedules that execute efficiently. When evaluating software performance, the access time to the various levels of the memory hierarchy of data processing system 10 is often of interest in order to identify the frequency of accesses which require over a particular number of cycles to complete.

To monitor access times to memory, the user first sets the appropriate bit fields within MMCR0 utilizing suitable software executed by processor 30. Setting bits 26–31 within MMCR0 instructs performance monitor 32 to monitor accesses to L1 cache 48 and system memory, which is accessed via bus interface unit 50. In addition, by setting other bits within MMCR0, the user selects a threshold number of clock cycles and instructs PMC2 to count the occurrences of accesses which require longer than the threshold number of cycles to complete. By setting bits 19–25 of MMCR0 to select the overflow signal from PMC2 as the event counted by PMC1, the user links PMC1 and PMC2 to form a 32-bit counter. Finally, the user sets bit 17 of MMCR0 to disable the interrupt generated when PMC2 becomes negative. Depending upon the application, the user may choose either to disable or enable the interrupt generated when PMC1 becomes negative by setting bit 16 of MMCR0.

Upon execution of the software under analysis, performance monitor 32 receives signals from L1 cache 48 and bus interface unit 50 via internal bus 52 which indicate accesses to memory. Event detection and counter control logic 34 determines from these signals which accesses require more than the threshold number of cycles to complete. Then, utilizing the values of the bit fields within MMCR0, event detection and counter control logic 34 selects which events are counted among the plurality of inputs to multiplexers 80 and 82 by transmitting control signals 96 and 98. Thus, as determined by the bit values within MMCR0, PMC2 increments in response to memory accesses that require more than the threshold number of cycles to complete and PMC1 counts overflows from PMC2. When the performance analysis terminates at the completion of the software routine or at a user-defined interrupt, PMC1 and PMC2 contain the 32-bit value of the number of memory accesses which required greater than the threshold number of cycles to complete. Utilizing appropriate software commands, a user may then read the count value stored in PMC1 and PMC2.

The method and system of the present invention enhance both the functionality and flexibility of the performance monitor. When the maximum number of occurrences of selected events is anticipated to be less than $2^{16}$, a user may configure the performance monitor to monitor up to four events within the data processing system. However, if the number of anticipated event occurrences would cause a single PMC to overflow, a user may configure the performance monitor to count up to $2^{64}$ occurrences without overflow. Thus, the present invention provides both the functionality of a large counter size and the flexibility of monitoring several events simultaneously, while reducing the chip area allocated to the performance monitor.

While the invention has been particularly shown and described with reference to a preferred embodiment, it will be understood by those skilled in the art that various changes in form and detail may be made therein without departing from the spirit and scope of the invention.

I claim:

1. A system for monitoring specified events among a plurality of events within a data processing system, comprising:

means for specifying selected events among said plurality of events which are to be monitored;

means for monitoring said specified events;

means for detecting each occurrence of a specified event; and a plurality of counters which incrementally advance in response to an occurrence of a specified event, wherein responsive to said means for specifying selected events at least one other counter among said plurality of counters is interconnected to a first counter and programmed to incrementally advance in response to an overflow from said first counter.

2. The system for monitoring events within a data processing system of claim 1, wherein said means for specifying selected events to be monitored comprises a control register including a plurality of bits, wherein settings of particular bits among said plurality of bits within said control register specify, for each of said plurality of counters, an event to be counted.

3. The system for monitoring events within a data processing system of claim 1, wherein said plurality of counters are 16-bit counters.

4. A processor comprising:

a plurality of functional units for manipulating data which generate a plurality of events during operation of said processor;

means for specifying selected events among said plurality of events which are to be monitored;

means for monitoring said specified events;

means for detecting each occurrence of a specified event; and a plurality of counters which incrementally advance in response to an occurrence of a specified event, wherein responsive to said means for specifying selected events at least one other counter among said plurality of counters is interconnected to a first counter and programmed to incrementally advance in response to an overflow from said first counter.

5. The processor of claim 4, wherein said means for specifying selected events to be monitored comprises a control register including a plurality of bits, wherein settings of particular bits among said plurality of bits within said control register specify, for each of said plurality of counters, an event to be counted.

6. The processor of claim 4, wherein said plurality of counters are 16-bit counters.

7. A method of monitoring events within a data processing system including a plurality of counters, wherein each counter among said plurality of counters counts occurrences of a specified event within said data processing system, said method comprising:

specifying events to be monitored within said data processing system, wherein one of said specified events is an overflow signal from a first counter among said plurality of counters;

monitoring said specified events within said data processing system;

in response to detecting an occurrence of a particular specified event, incrementing said first counter; and in response to detecting an overflow from said first counter, incrementing a second counter, such that a maximum number of occurrences which may be counted by said plurality of counters is dynamically alterable.

8. The method of monitoring events within a data processing system of claim 7, wherein said step of specifying selected events to be monitored comprises setting particular bits among a plurality of bits within a control register to specify, for each of said plurality of counters, an event to be counted.

* * * * *